Patented Apr. 13, 1926.

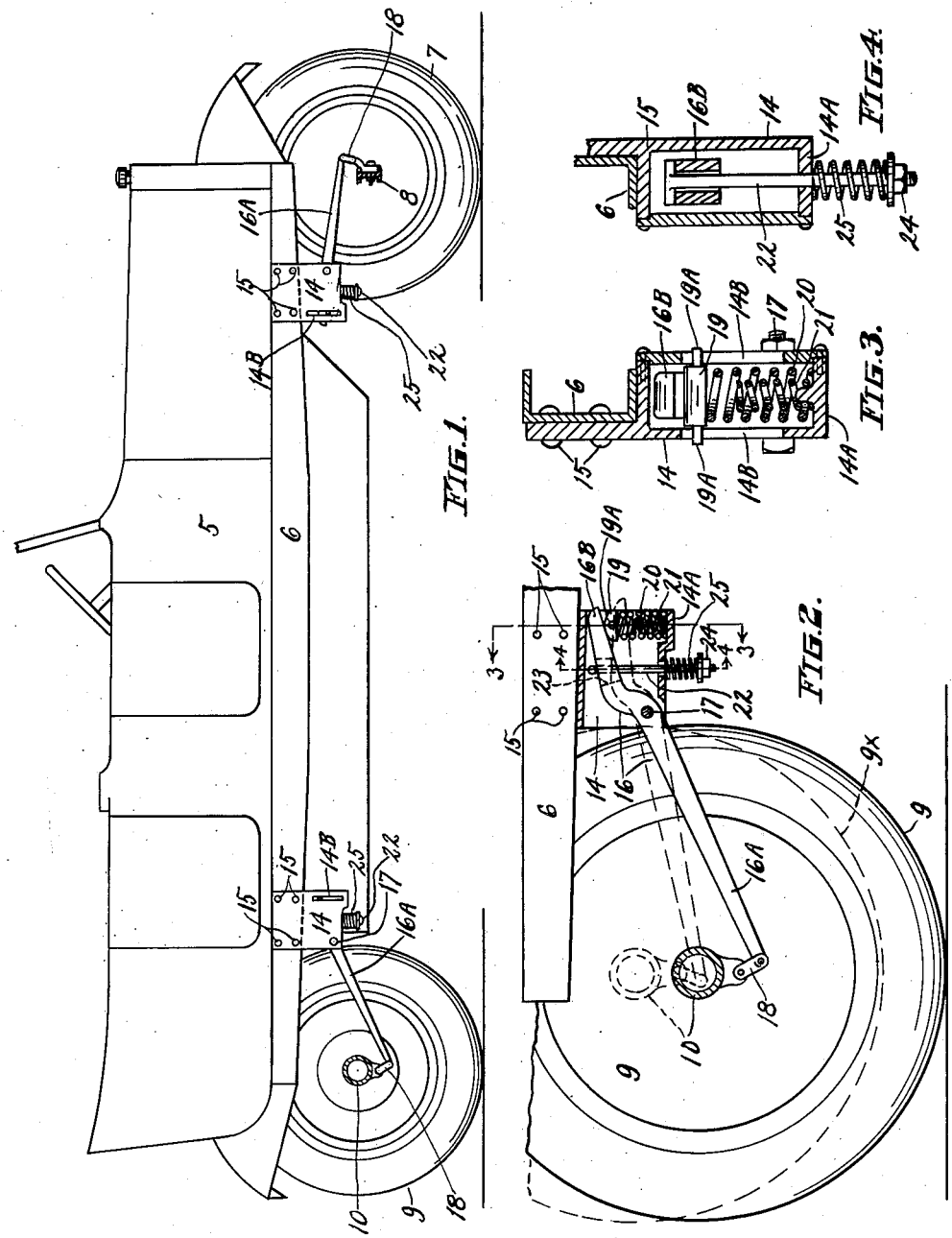

1,580,152

UNITED STATES PATENT OFFICE.

LUDWIG MULLNER AND MATHIAS THELL, OF ST. PAUL, MINNESOTA.

BODY-SUPPORTING AND SHOCK-ABSORBING DEVICE FOR VEHICLES.

Application filed March 19, 1925. Serial No. 16,650.

*To all whom it may concern:*

Be it known that we, LUDWIG MULLNER and MATHIAS THELL, citizens of the United States, residing at St. Paul, in the county of Ramsey and State of Minnesota, have invented certain new and useful Improvements in Body-Supporting and Shock-Absorbing Devices for Vehicles, of which the following is a specification.

Our invention relates to body supporting and shock absorbing devices for vehicles in general and the object is to provide a simple, efficient and economical spring mounting particularly adaptable for motor vehicles and which eliminates the use of elongated leaf springs of various types well known in the automotive field.

In the accompanying drawing:

Fig. 1 is a side elevation of an automobile embodying our improved device, the right or near side ground wheels of the auto being omitted.

Fig. 2 is an enlarged partly sectional elevation of our device in operative position fixed on an auto frame and connected with the rear axle of the auto.

Fig. 3 is an enlarged sectional detail as on line 3—3 in Fig. 2.

Fig. 4 is an enlarged sectional detail as on line 4—4 in Fig. 2.

Referring to the drawing by reference numerals, 5 designates any type of vehicle body shown as an automobile body of the open type, mounted on a chassis with the usual channel shaped main frame members 6 of which there are two arranged parallel and longitudinally. 7 are the front ground wheels, 8 the front axle, 9 the rear wheels on the rear axle 10, all in approximately correct relative positions.

In vehicles embodying our device the frame members 6 may terminate just over or near each axle (see Fig. 1). Our device comprises for each axle two hollow housings 14 one secured on the left hand frame member 6 and the other to the right hand member 6 as at 15 in certain spaced relation to the axle. Each housing comprises a longitudinal inclosure below the channel 6, said inclosure having two transversely spaced veltical walls and a bottom 14$^A$ but its ends open as shown.

16 is a beam lever pivoted on a pin or bolt 17 arranged transversely between and in the side walls of and adjacent one end of the housing 14 in its lower part. This lever is normally extended downwardly and outwardly from its pivot to form a long arm 16$^A$ the extremity of which is pivotally connected with an oscillable link member 18 pivotally fixed to either axle 8—10. This lever 16 has a short arm 16$^B$ normally inclined upwardly from pivot 17 and bears on a crosshead 19 (Figs. 2 and 3) having opposite pins 19$^A$ or other suitable guiding lugs each guided in a vertical slot 14$^B$ in the adjacent wall of the housing 14. The lever arm 16$^B$ is normally held in the upwardly inclined position by a vertically arranged helical coil spring 20 constantly in compression between the under side of the crosshead and the bottom 14$^A$ of the housing.

It is of course understood that there are four of our devices used on an automobile, two for each axle, and all the four springs 20 tend at all times to hold their levers 16 in the inclined positions and the vehicle body is thus supported yieldingly and in proper spaced relation to the axles. The compression of the coil springs 20 will vary according to loads carried but for excessive loads we provide a short coil spring 21 arranged concentric within each spring 20 (see Fig. 3). Thus when a very heavy load is being carried or the wheels strike large ruts or projections the levers 16 are rocked the lever arm 16$^B$ first compresses spring 20 and then comes in contact with and presses downwardly also on spring 21, but under ordinary conditions only springs 20 are in use.

22 is a T-shaped vertically disposed bolt the T-head of which rests on the upper face of arm 16$^B$ and its shank extends downwardly through a slot 23 in the lever, thence through the housing bottom 14$^A$. The part of the shank extending below 14$^A$ is threaded for a nut 24 adapted to regulate the compression of a coil spring 25 between it and said bottom 14$^A$. This spring should always be in compression and exerts a downward pressure on arm 16$^B$. When a wheel strikes an obstruction and is suddenly raised about as to dotted line 9$^x$ in Fig. 2 the lever arm 16$^B$ moves suddenly down and compresses the springs 20—21 as previously set forth, and said springs immediately spring back when the obstruction has been passed and tend to bring arm 16 back to normal position. This latter action is of course very rapid and unless checked or neutralized would jar the car body or cause vibration of same; but the spring 25 and bolt 22 of our device counteracts somewhat the sudden rebound of the main lever 16 and acting as a cushioning means.

It is obvious that the levers 16 may be connected with upright clips 18 as shown on the front axle in Fig. 1 or to hanging clips 18 as shown on the rear axle. In either case the clips act the same as on cars with leaf springs, taking up the horizontal variation of the outer ends of arms 16ᴬ when the axles vary in position relative to the body of the vehicle.

What we claim is:

1. In a vehicle having ground wheels, an axle for each pair of wheels and a body supporting frame mounted in spaced relation to said axles, a pair of levers for each axle, each lever fulcrumed in means fixed on said frame to oscillate in a vertical plane longitudinally of the vehicle body, means connecting one arm of each said levers with the axle, the opposite end of the lever comprising a short arm, a spring element adapted to be compressed by said short arm, a secondary spring element intermediate the free end of the short arm and the fulcrum of the lever and operatively engaging said short arm and exerting a downward pressure on said short arm, said spring element compressed by the outer end of the short lever arm comprising a main coil spring engaged by a vertically slidable crosshead frictionally engaged by said lever and its lower side engaging the upper end of the spring, said means in which the lever is fulcrumed comprisng a frame fixed on the vehicle body supporting frame and having a bottom engaged by the lower end of said coil spring, and an auxiliary spring arranged concentrically within the main spring.

2. In a vehicle having ground wheels, an axle for each pair of wheels and a body supporting frame mounted in spaced relation to said axles, a pair of levers for each axle, each lever fulcrumed in means fixed on said frame to oscillate in a vertical plane longitudinally of the vehicle body, means connecting one arm of each said levers with the axle, the opposite end of the lever comprising a short arm, a spring element adapted to be compressed by said short arm, a secondary spring element intermediate the free end of the short arm and the fulcrum of the lever and operatively engaging said short arm and exerting a downward pressure on said short arm, said spring element compressed by the outer end of the short lever arm comprising a main coil spring engaged by a vertically slidable crosshead frictionally engaged by said lever and its lower side engaging the upper end of the main spring, said means in which the lever is fulcrumed comprising a frame fixed on the vehicle body supporting frame and having a bottom engaged by the lower end of the main spring, and an auxiliary spring arranged concentrically within the main spring, said auxiliary spring being secured to said body of the lever frame and being shorter than the main spring for the purpose described.

In testimony whereof we affix our signatures.

LUDWIG MULLNER.
MATHIAS THELL.